United States Patent Office 2,875,223
Patented Feb. 24, 1959

2,875,223

DICYCLOPENTADIENYLIRON DERIVATIVES

Charles J. Pedersen, Salem, N. J., and Viktor Weinmayr, Landenberg, Pa., assignors to E. I. du Pont de Nemours & Company, Wilmington, Del., a corporation of Delaware No Drawing. Application August 18, 1954
Serial No. 450,795

16 Claims. (Cl. 260—439)

This invention relates to new acetoacetyl derivatives of dicyclopentadienyliron and to useful metal chelates which are prepared therefrom.

Organo-metallic compounds in which the metal is directly attached to a hydrocarbon represent an important class of compounds. Familiar examples of this type include tetraethyl lead which is used as an antiknock in motor fuels, ethyl mercury compounds which are useful as fungicides, and the alkyl and aryl derivatives of magnesium, sodium, lithium and so on, which are widely used as reagents in organic syntheses. The first compound to be discovered in which iron is directly attached to hydrocarbon is dicyclopentadienyliron, which has been found to be useful as an antiknock in spark ignition engines and which serves as a starting point in the preparation of various other organo-iron compounds. Dicyclopentadienyliron is disclosed and claimed in Pauson U. S. Patent No. 2,680,756 and its use as an antiknock in U. S. application Serial No. 370,286, filed July 27, 1953.

Organo-metallic compounds are also known in which the metal is attached to the organic portion of the molecule through chelation, as in the compounds nickel dimethylglyoxime, copper phthalocyanine and the various metal chelates of ethylene diamine tetraacetic acid. The metal chelates are useful in the field of analytical chemistry and as antimicrobial agents, water purifiers, dyes and petroleum additives.

It is an object of this invention to provide derivatives of dicyclopentadienyliron which are chelating agents. It is a further objective to provide metal chelates which contain a plurality of metallic components, at least one of which is iron.

The novel compounds of this invention are dicyclopentadienyliron derivatives having the formula:

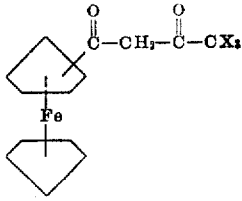

in which X represents a member of the group consisting of hydrogen and fluorine. These compounds are red brown crystalline materials. Acetoacetylcyclopentadienyl(cyclopentadienyl)iron melts at 96–97° C., while trifluoroacetoacetylcyclopentadienyl(cyclopentadienyl)-iron melts at 100–102° C.

These compounds are prepared by reacting acetylcyclopentadienyl(cyclopentadienyl)iron with a compound having the formula R·OOC·CX₃ in which X is hydrogen or fluorine and R is a lower alkyl group in the presence of a basic condensation agent. The common basic condensation agents useful for this purpose include sodium methylate, metallic sodium, and sodamide. The reaction product is first obtained in the form of the sodium enolate of the 1,3-diketone derivative of dicyclopentadienyliron, which may then be converted to the keto form by acidification.

Acetylcyclopentadienyl(cyclopentadienyl)iron, which is used as a starting material in this preparation, may be made by the reaction between dicyclopentadienyliron and acetic anhydride at 30 to 60° C. in the presence of anhydrous hydrogen fluoride. This compound and the method of preparing it are disclosed and claimed in U. S. application Serial No. 352,029 of Weinmayr, filed April 29, 1953.

Metal chelates are formed from the acetoacetyl derivatives of dicyclopentadienyliron by dissolving the diketone in an organic solvent such as acetone and adding an aqueous solution of a metal salt. In some cases the addition of ammonia or sodium acetate will aid in the formation of the metal chelate. The metal chelate is ordinarily isolated by filtering off the solid, washing and purifying by conventional techniques.

Any of the common chelate-forming metals will undergo chelation with the acetoacetyl derivatives of dicyclopentadienyliron. The term "metal" is used herein in accord with its ordinary meaning to include the metal elements and not any non-metallic element such as hydrogen. All metals other than the alkali metals and the higher alkaline earth metals beginning with calcium fall within the category of common chelate-forming metals. Thus, the common chelate-forming metals are Be, B, Mg, Al, Si, Sc, Ti, V, Cr, Mn, Fe, Co, Ni, Cu, Zn, Ga, Ge, As, Y, Zr, Cb, Mo, Ma, Ru, Rh, Pd, Ag, Cd, In, Sn, Sb, lanthanides, Hf, Ta, W, Re, Os, Ir, Pt, Au, Hg, Tl, Pb, Bi, and actinides. It will of course be understood that the different chelate-forming metals will form chelates with the diketone derivatives of dicyclopentadienyliron with varying ease. Thus, the lead chelate forms very readily, while the manganese derivative is obtained less easily.

The acetoacetyl derivatives of dicyclopentadienyliron of this invention, the method of preparing them and their use in the formation of metal chelates are illustrated in the following examples, in which parts are given by weight.

EXAMPLE 1

*Preparation of acetylcyclopentadienyl (cyclopentadienyl)iron*

Into a 1000 ml. capacity stainless steel vessel are charged 200 parts of acetic anhydride and 65 parts of dicyclopentadienyliron (M. P. 174° C.). The vessel is closed, cooled to below 0° C., and connected with a container of anhydrous hydrogen fluoride. From 300 to 330 parts of anhydrous hydrogen fluoride are added to the charge over a period of about 15 minutes while cooling is maintained to keep the temperature below 10° C. The hydrogen fluoride container is then disconnected and the reaction vessel is agitated. The temperature of the charge is raised to 40° over a period of two hours and agitation is continued at 40–43° for 12 hours. The charge is then poured into 2000 parts of cold water while keeping the temperature of the dilution mass below 40° C. An orange-colored crystalline precipitate of acetylcyclopentadienyl(cyclopentadienyl)iron is obtained. After filtration, washing, and drying it weighs 62 parts equal to a yield of 83% based on dicyclopentadienyliron. It melts at 83–84° C. and is pure enough for most uses. Upon crystallization from isooctane, pure acetylcyclopentadienyl(cyclopentadienyl)iron is obtained in the form of dark orange needles melting at 86° C. Repeated crystallization does not change this melting point.

*Preparation of acetoacetylcyclopentadienyl (cyclopentadienyl)iron*

Ethyl acetate (48 pts.) mixed with ether (80 pts.) is added at 20–25° C. and in about one hour to a suspension of sodium methylate (30 pts.) in ether (500 pts.). One hour later acetylcyclopentadienyl(cyclopentadienyl)iron (114 pts.) is added in about thirty minutes, and the charge is agitated at room temperature overnight. Air is excluded from the reaction mass by bleeding nitrogen through the reaction vessel.

The yellow, crystalline precipitate which forms is filtered and washed with ether (500 pts. or more) to remove unreacted acetylcyclopentadienyl(cyclopentadienyl)iron. Upon evaporation of the ether 54% of the original starting material is recovered.

The yellow filter cake is added to about 500 pts. of water previously heated to 55–60°, the solution is clarified by filtration and without undue delay is acidified with hydrochloric acid. The precipitate which forms is filtered at room temperature, washed acid free, and dried at room temperature.

Acetoacetylcyclopentadienyl(cyclopentadienyl)iron (39 pts.) is obtained as red brown crystals melting at 95° C. This corresponds to a yield of 62.8% of theory based on the amount of acetylcyclopentadienyl(cyclopentadienyl)iron consumed.

After crystallization from isooctane (1 pt. in 10 pts. of solvent) the compound melts at 96–97° C. It dissolves in 96% sulfuric acid with a purple color.

Anal. calcd. for $C_{14}H_{14}O_2Fe$: M. W., 270; C, 62.2; H, 5.18; Fe, 20.75. Found: M. W., 284; C, 62.3; H, 5.06; Fe, 20.7.

EXAMPLE 2

*Preparation of trifluoroacetoacetylcyclopentadienyl(cyclopentadienyl)iron*

Ethyltrifluoroacetate (21 pts.) mixed with ether (20 pts.) is added to a suspension of sodium methylate (7 pts.) in ether (200 pts.). The charge is agitated at room temperature for an hour and acetylcyclopentadienyl(cyclopentadienyl)iron (23 pts.) is added. An orange precipitate forms while the charge is agitated for about 20 hours. The entire condensation is carried out under an atmosphere of nitrogen.

The orange, crystalline precipitate is filtered and washed with ether (about 500 pts.). The filter cake is dissolved in water (600 pts.) which has been heated to 45–50° C.

The solution is clarified by filtration, cooled to about 20° C. and acidified with hydrochloric acid. It is advantageous to carry out this operation without undue delay. It has been observed that a tarry precipitate forms when the alkaline solution is agitated for several hours while exposed to the air.

Crude trifluoroacetoacetylcyclopentadienyl(cyclopentadienyl)iron (26 pts., equal to 81.4% of theory) is obtained as a red brown, fluffy solid melting from 80–97° C. Upon crystallization from isooctane (200 pts.) pure trifluoroacetoacetylcyclopentadienyl(cyclopentadienyl)iron (24 pts.) is obtained in the form of coarse, dark red brown crystals, melting from 100–102° C. The product can be sublimed without decomposition.

Anal. calcd. for $C_{14}H_{11}F_3O_2Fe$: C, 51.58; H, 3.39; F, 17.58; Fe, 17.28. Found: C, 51.8; H, 3.35; F, 17.4; Fe, 17.2.

EXAMPLE 3

*Lead chelate of acetoacetylcyclopentadienyl(cyclopentadienyl)iron*

A solution of acetoacetylcyclopentadienyl(cyclopentadienyl)iron (2.7 pts.) in acetone (70 pts.) is added to a solution of lead diacetate (3.8 pts.) in water (25 pts.). After agitating at room temperature for two hours, 28% ammonia (2 pts.) is added and agitation is continued for about ten hours. The orange precipitate which forms is filtered, washed with water (this dilution produces no further precipitate in the filtrate) and dried at room temperature. The crude lead chelate of acetoacetylcyclopentadienyl(cyclopentadienyl)iron is obtained as an orange colored solid melting at 220–225° C. with apparent decomposition. It is moderately soluble in benzene, and poorly soluble in acetone or gasoline.

Upon crystallization from monochlorobenzene (425 pts.) the pure lead chelate of acetoacetylcyclopentadienyl(cyclopentadienyl)iron (1.6 pts.) is obtained as orange colored crystals melting from 238–240° C.

Anal. calcd. for $C_{28}H_{26}Fe_2O_4Pb$: C, 45.2; H, 3.5; Fe, 15.8; Pb, 27.8. Found: C, 44.8; H, 3.61; Fe, 15.4; Pb, 27.7.

EXAMPLE 4

*Uranyl chelate of acetoacetylcyclopentadienyl(cyclopentadienyl)iron*

A solution of acetoacetylcyclopentadienyl(cyclopentadienyl)iron (5.4 pts.) in acetone (90 pts.) is added to a solution of uranyl chloride (6.8 pts.) and sodium acetate (3 pts.) in water (15 pts.). The resulting deep red reaction mass is agitated overnight and then filtered from some insoluble, dark colored material.

The filtrate is diluted with water (600 pts.). A tarry precipitate forms which slowly changes to a crystalline solid. The crude product thus obtained (6 pts., M. P. 170–175° C.) is dissolved in benzene (250 pts.) and the benzene is allowed to evaporate at room temperature.

The product is soluble in benzene but does not readily crystallize from it. It is quite insoluble in high boiling gasoline. When it is attempted to crystallize the product from high boiling gasoline (800 pts.) pure uranyl chelates of acetoacetylcyclopentadienyl(cyclopentadienyl)iron are obtained upon cooling of the filtrate (0.6 pt.), and also as the undissolved residue (2.5 pts.). Both samples are identical, melting at 177–185° C.

Anal. calcd. for $C_{28}H_{26}Fe_2O_4UO_2$: C, 41.6; H, 3.2; Fe, 13.87; U, 29.45. Found: C, 41.6; H, 3.5; Fe, 13.4; U, 28.4.

EXAMPLE 5

*Cobaltous chelate of acetoacetylcyclopentadienyl(cyclopentadienyl)iron*

A solution of cobalt acetate (3.75 pts.) in water (30 pts.) is added to a solution of acetoacetylcyclopentadienyl(cyclopentadienyl)iron (8.1 pts.) in acetone (140 pts.). The charge is agitated at room temperature for about ten hours and a light orange colored precipitate forms during that time. After filtration, washing with water and drying at room temperature, the crude cobaltous chelate of acetoacetylcyclopentadienyl(cyclopentadienyl)iron (6.9 pts., equal to 77.8% of theory) is obtained as an orange colored solid melting with decomposition at 225° C.

Anal. calcd. for $C_{28}H_{26}Fe_2O_4Co$: Co, 9.89; Fe, 18.87. Found: Co, 8.4; Fe, 19.5.

The compound is poorly soluble in benzene, gasoline, alcohol, and acetone. Upon crystallization from pyridine (110 pts.) the cobaltous chelate of the acetoacetylcyclopentadienyl(cyclopentadienyl)iron is obtained (3.3 pts.) as bright orange colored crystals containing two moles of pyridine of crystallization and melting at 205° C.

Anal. calcd. for $C_{38}H_{36}Fe_2N_2O_4Co$: C, 60.4; H, 4.78; N, 3.71; Fe, 14.84. Found: C, 60.6; H, 4.81; N, 4.00 (Dumas); Fe, 14.3.

EXAMPLE 6

*Nickel chelate of acetoacetylcyclopentadienyl(cyclopentadienyl)iron*

A solution of nickel acetate (1.37 pts.) and sodium acetate (1 pt.) in water (20 pts.) is added to a solution of acetoacetylcyclopentadienyl(cyclopentadienyl)iron (2.7 pts.) in acetone (50 pts.). A yellow precipitate forms while the reaction mass is agitated at room temperature for about twenty hours.

Upon filtration, washing with water (200 pts.) and drying in the air the crude nickel chelate of acetoacetylcyclopentadienyl(cyclopentadienyl)iron (2.9 pts., equal to a yield of 100%) is obtained as a yellow solid which does not melt below 300° C. This product is very insoluble in the common organic solvents.

Anal. calcd. for $C_{28}H_{26}Fe_2NiO_4$: C, 56.3; H, 4.35; Fe, 18.77; Ni, 9.89. Found: C, 54.9; H, 4.51; Fe, 18.1; Ni, 7.05.

EXAMPLE 7

*Copper chelate of acetoacetylcyclopentadienyl (cyclopentadienyl)iron*

A solution of copper acetate (2.2 pts.) and sodium acetate (1.1 pts.) in water (40 pts.) is added to a solution of acetoacetylcyclopentadienyl(cyclopentadienyl)iron (5.4 pts.) in acetone (60 pts.). The light brown precipitate which quickly forms is filtered after several hours of agitating the reaction mass. The crude copper chelate of acetoacetylcyclopentadienyl(cyclopentadienyl)-iron thus obtained (5.6 pts., equal to a yield of 93%) melts at 232–233° C.

The crude product is crystallized from benzene (1300 pts.) and the pure copper chelate of acetoacetylcyclopentadienyl(cyclopentadienyl)iron (3.5 pts.) is obtained in the form of brown crystals melting at 242° C. The compound dissolves in 96% sulfuric acid with a purple color which changes quickly to yellow.

Anal. calcd. for $C_{28}H_{26}CuFe_2O_4$: C, 55.9; H, 4.33; Cu, 10.56; Fe, 18.62. Found: C, 56.0; H, 4.66; Cu, 10.0; Fe, 18.7.

EXAMPLE 8

*Ferric chelate of acetoacetylcyclopentadienyl (cyclopentadienyl)iron*

A solution of acetoacetylcyclopentadienyl(cyclopentadienyl)iron (2.7 pts.) in acetone (50 pts.) is added to a solution of ferric chloride (3.2 pts.) and sodium acetate (3 pts.) in water (60 pts.). The dark brown reaction mass is agitated at room temperature overnight. Upon filtration, washing with water, and drying in air the crude ferric chelate of acetoacetylcyclopentadienyl(cyclopentadienyl)iron (2.5 pts.) is obtained as a brown solid, melting at 254–258° C. This crude product is extracted with hot benzene (700 pts.). Upon concentration of the benzene solution the purified ferric chelate of acetoacetylcyclopentadienyl(cyclopentadienyl)iron (1.3 pts.) is obtained as a brown powder melting at 263° C., and dissolving in 96% sulfuric acid with a purple color.

Anal. calcd. for $C_{42}H_{39}Fe_4O_6$: C, 58.4; H, 4.53; Fe, 25.9. Found: C, 59.1; H, 4.61; Fe, 24.1.

EXAMPLE 9

*Lead chelate of trifluoroacetoacetylcyclopentadienyl (cyclopentadienyl)iron*

A solution of lead diacetate (10 pts.) in water (125 pts.) is added to a solution of trifluoroacetoacetylcyclopentadienyl(cyclopentadienyl)iron (16.2 pts.) in acetone (225 pts.). After agitating at room temperature for two hours 28% ammonia (9 pts.) is added. Formation of an orange precipitate begins before the ammonia is added. The reaction mass is agitated overnight and the precipitate is then filtered, washed with water, and dried at room temperature.

A lead chelate of trifluoroacetoacetylcyclopentadienyl-(cyclopentadienyl)iron (18 pts., equal to 84.6% of theory) of high purity is obtained, melting at 216° C.

Upon crystallization from toluene (16 pts. in 250 pts. solvent) the pure lead chelate of trifluoroacetoacetylcyclopentadienyl(cyclopentadienyl)iron (13 pts.) is obtained in the form of brick red needles melting at 219° C.

Anal. calcd. for $C_{28}H_{20}F_6Fe_2O_4Pb$: C, 39.4; H, 2.34; F, 13.36; Fe, 13.12; Pb, 24.25. Found: C, 39.6; H, 2.50; F, 12.8; Fe, 13.5; Pb, 24.4.

EXAMPLE 10

*Copper chelate of trifluoroacetoacetylcyclopentadienyl (cyclopentadienyl)iron*

A solution of copper acetate (6 pts.) and sodium acetate (5 pts.) in water (100 pts.) is added to a solution of trifluoroacetoacetylcyclopentadienyl(cyclopentadienyl)iron (16.2 pts.) in acetone (300 pts.). The charge is agitated at room temperature for about four hours, and the brown precipitate which quickly forms is filtered, washed and dried at room temperature.

The copper chelate of trifluoroacetoacetylcyclopentadienyl(cyclopentadienyl)iron (17.3 pts.) is obtained as red brown crystals. This crude product, which is already of high purity according to the analysis, is further purified by crystallizing it (15 pts.) from monochlorobenzene (650 pts.).

The pure copper chelate of trifluoroacetoacetylcyclopentadienyl(cyclopentadienyl)iron (6.2 pts.) is obtained in the form of dark reddish brown crystals. The compound does not melt below 300° C.

Anal. calcd. for $C_{28}H_{20}CuF_6Fe_2O_4$: C, 47.35; H, 2.82; F, 16.07; Fe, 15.78; Cu, 8.96. Found: C, 47.8; H, 2.98; F, 15.7; Fe, 16.2; Cu, 8.21.

EXAMPLE 11

*Uranyl chelate of trifluoroacetoacetylcyclopentadienyl (cyclopentadienyl)iron*

A solution of uranyl chloride (17 pts.) and sodium acetate (8 pts.) in water (45 pts.) is added to a solution of trifluoroacetoacetylcyclopentadienyl(cyclopentadienyl)iron (16.2 pts.) in acetone (280 pts.). The color of the reaction mass changes from red to purple while the charge is agitated overnight under an atmosphere of nitrogen.

The charge is then clarified by filtration and a water soluble, yellow uranium salt (2.8 pts., analyzing 49% U and 2.7% Cl) is recovered.

The acetone filtrate is poured into cold water (1500 pts.) and a tarry precipitate forms and slowly solidifies. It is washed by decantation with water, and dissolved in benzene (600 pts.). The benzene solution is washed with water and dried with anhydrous sodium sulfate. Upon evaporation on the steam bath a tarry residue is obtained which changes to a crystalline solid when triturated with petroleum ether. The solid is filtered, washed with petroleum ether and dried at room temperature.

The uranyl chelate of trifluoroacetoacetylcyclopentadienyl(cyclopentadienyl)iron is obtained (22 pts., equal to a yield of 96.6%) as a purple colored solid melting at about 150° C. It is very soluble in benzene and acetone, and is soluble in 60% methanol and similar solvents. It is crystallized from high boiling gasoline (21 pts. in 800 pts.).

The pure uranyl chelate of trifluoroacetoacetylcyclopentadienyl(cyclopentadienyl)iron is obtained (17.5 pts.) in the form of reddish blue crystals melting from 140–150° C. (end point not sharp). The product dissolves in 96% sulfuric acid with a blue color which changes to green after a short time.

Anal. calcd. for $C_{28}H_{20}F_6Fe_2O_6U$: F, 12.44; Fe, 12.23; U, 25.98. Found: F, 11.4; Fe, 12.47; U, 24.21.

When a sample of this chelate is agitated in dilute hydrochloric acid it decomposes to form a water-soluble uranium salt and pure trifluoroacetoacetylcyclopentadienyl(cyclopentadienyl)iron.

The new compounds of this invention have many varied applications. The diketone derivatives of dicyclopentadienyliron can be used to remove the common chelate-forming metal ions from systems in which they are present in small amount but produce some undesirable effect. In the rubber industry, these compounds may be incorporated into rubber and rubber latices to inhibit the undesirable effect of copper or other metals. They may be added to fats and oils to prevent rancidity caused by the catalytic activity of trace amounts of metals. They may be employed in analytical procedures and in chemical purification processes generally.

The metal chelates themselves provide a useful means for adding small amounts of metals to systems where such amounts are beneficial. Thus trace amounts of metals useful as nutrients for living systems may be supplied by incorporating the metal chelates of the dicyclopentadienyliron derivatives of this invention in soil or fertilizers. The metal chelates may be added to combustion fuels, to reduce smoking tendencies of Diesel or rocket fuels and to act as an antiknock in gasoline. They may be added to glass or organic plastic materials to produce coloring effects. The mercury chelates of these compounds have antimicrobial activity and are useful as fungicides and as bactericides. They are also useful as catalysts.

What is claimed is:

1. A dicyclopentadienyliron derivative having the formula:

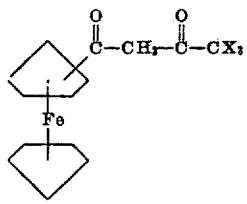

in which X represents a member of the group consisting of hydrogen and fluorine.

2. Acetoacetylcyclopentadienyl (cyclopentadienyl) iron.

3. Trifluoroacetoacetylcyclopentadienyl (cyclopentadienyl) iron.

4. The process of preparing a dicyclopentadienyliron derivative having the formula:

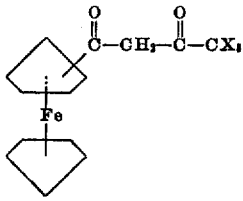

in which X represents a member of the group consisting of hydrogen and fluorine which comprises reacting acetylcyclopentadienyl (cyclopentadienyl) iron with a compound having a formula R·OOC·CX₃, in which X has the significance above stated and R is a lower alkyl group, in the presence of a basic condensation agent of the group consisting of a sodium alcoholate, metallic sodium and sodamide, and then acidifying the reaction product.

5. The process of claim 4 in which the basic condensation catalyst is sodium methylate.

6. A metal chelate of the compound of claim 1, said metal being a common chelate-forming metal.

7. A metal chelate of acetacetylcyclopentadienyl (cyclopentadienyl)iron, said metal being a common chelate-forming metal.

8. A metal chelate of trifluoroacetoacetylcyclopentadienyl (cyclopentadienyl) iron, said metal being a common chelate-forming metal.

9. A uranyl chelate of trifluoroacetoacetylcyclopentadienyl (cyclopentadienyl) iron.

10. A lead chelate of trifluoroacetoacetylcyclopentadienyl (cyclopentadienyl) iron.

11. A lead chelate of acetoacetylcyclopentadienyl (cyclopentadienyl) iron.

12. A copper chelate of acetoacetylcyclopentadienyl (cyclopentadienyl) iron.

13. A ferric chelate of acetoacetylcyclopentadienyl (cyclopentadienyl) iron.

14. A uranium chelate of the compound of claim 1.

15. An iron chelate of the compound of claim 1.

16. A dicyclopentadienyliron derivative of the group consisting of a compound having the formula

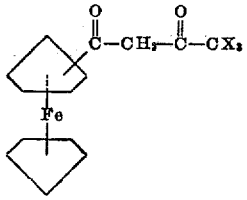

in which X represents a member of the group consisting of hydrogen and fluorine, and a metal chelate of said compound in which the metal is a common chelate-forming metal.

References Cited in the file of this patent

Schlesinger et al.: Abstract of application Serial No. 662,600, published March 6, 1951, 644 O. G. 305.

Woodward et al.: Jour. Chem. Soc., vol. 74, pp. 3458 and 3459, July 5, 1952.

Martell et al.: "Chemistry of the Chelate Compounds," 1952, p. 551.

UNITED STATES PATENT OFFICE

CERTIFICATE OF CORRECTION

Patent No. 2,875,223                                  February 24, 1959

Charles J. Pedersen et al.

It is hereby certified that error appears in the printed specification of the above numbered patent requiring correction and that the said Letters Patent should read as corrected below.

Column 5, line 57, for "(10 pts.)" read -- (19 pts.) --; column 7, line 48, for "a formula" read -- the formula --; column 8, line 8, for "acetacetylcyclopentadienyl" read -- acetoacetylcyclopentadienyl --.

Signed and sealed this 9th day of June 1959.

(SEAL)
Attest:

KARL H. AXLINE                                          ROBERT C. WATSON
Attesting Officer                                     Commissioner of Patents